(12) United States Patent
Kim (10) Patent No.: US 8,411,865 B2
(45) Date of Patent: Apr. 2, 2013

(54) KEY MANAGEMENT METHOD FOR BROADCAST ENCRYPTION IN TREE TOPOLOGY NETWORK

(75) Inventor: Hee Jean Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1626 days.

(21) Appl. No.: 11/448,724

(22) Filed: Jun. 8, 2006

(65) Prior Publication Data

US 2006/0282666 A1    Dec. 14, 2006

(30) Foreign Application Priority Data

Jun. 9, 2005    (KR) ........................ 10-2005-0049338

(51) Int. Cl.
*H04L 9/08*    (2006.01)
(52) U.S. Cl. ...................................................... 380/278
(58) Field of Classification Search .................. 380/277, 380/278; 713/158, 163
See application file for complete search history.

(56) References Cited

U.S. PATENT DOCUMENTS

| | | | |
|---|---|---|---|
| 7,043,024 B1 * | 5/2006 | Dinsmore et al. ............ | 380/278 |
| 7,340,603 B2 * | 3/2008 | Asano ........................... | 713/163 |
| 2002/0147906 A1 * | 10/2002 | Lotspiech et al. ............ | 713/158 |
| 2005/0018853 A1 * | 1/2005 | Lain et al. ..................... | 380/277 |

OTHER PUBLICATIONS

Naor, et al., "Revocation and Tracing Schemes for Stateless Receivers", Advances in Cryptology-CRYPTO 2001, total 33 pages, Feb. 24, 2001.
Communication dated Jun. 17, 2011 from the Korean Patent Office in a counterpart No. 10-2005-0049338.

* cited by examiner

*Primary Examiner* — Ellen Tran
(74) *Attorney, Agent, or Firm* — Sughrue Mion, PLLC (57) ABSTRACT

A key management method for broadcast encryption in a tree topology network which includes a plurality of nodes is provided. The method includes forming a plurality of first node groups each of which includes a node at a second layer and nodes, which belong to the node at the second layer, at a first layer in the tree topology network; forming a plurality of second node groups each of which includes a node at a third layer, at least one node which belongs to the node at the third layer, and at least one node which belongs to the node at the third layer and which forms one of the first node groups, in the tree topology; assigning a plurality of first keys which are shared by subsets of the nodes of the first node groups at the first layer, to each of the first node groups, respectively; assigning a plurality of second keys which are shared by subsets of the nodes of the second node groups at the second layer, to each of the second node groups, respectively; and transmitting an update key which is encrypted using at least one key of either the plurality of first keys or the plurality of second keys.

15 Claims, 10 Drawing Sheets

| Index | Data 1 | Data 2 | ...... | Data n |

Child : 3 , Router : 2 , Depth : 3

FIG. 6C

KEY MANAGEMENT METHOD FOR BROADCAST ENCRYPTION IN TREE TOPOLOGY NETWORK

CROSS-REFERENCE TO RELATED APPLICATIONS

This application claims priority from Korean Patent Application No. 2005-49338 filed on Jun. 9, 2005 in the Korean Intellectual Property Office, the entire disclosure of which is incorporated herein by reference.

BACKGROUND OF THE INVENTION

1. Field of the Invention

Methods consistent with the present invention relate to key management for broadcast encryption, and more particularly, to key management for broadcast encryption in a tree topology network.

2. Description of the Related Art

Broadcast encryption (BE) is a technique for a transmitter, that is, a broadcast center, to effectively transmit information only to intended users among all users. The BE needs to effectively work in a case where the aggregation of the users who are to receive the information changes arbitrarily and dynamically. An important property of the BE is to revoke or exclude unintended users, for example, illegal users or expired users.

Figure 1:
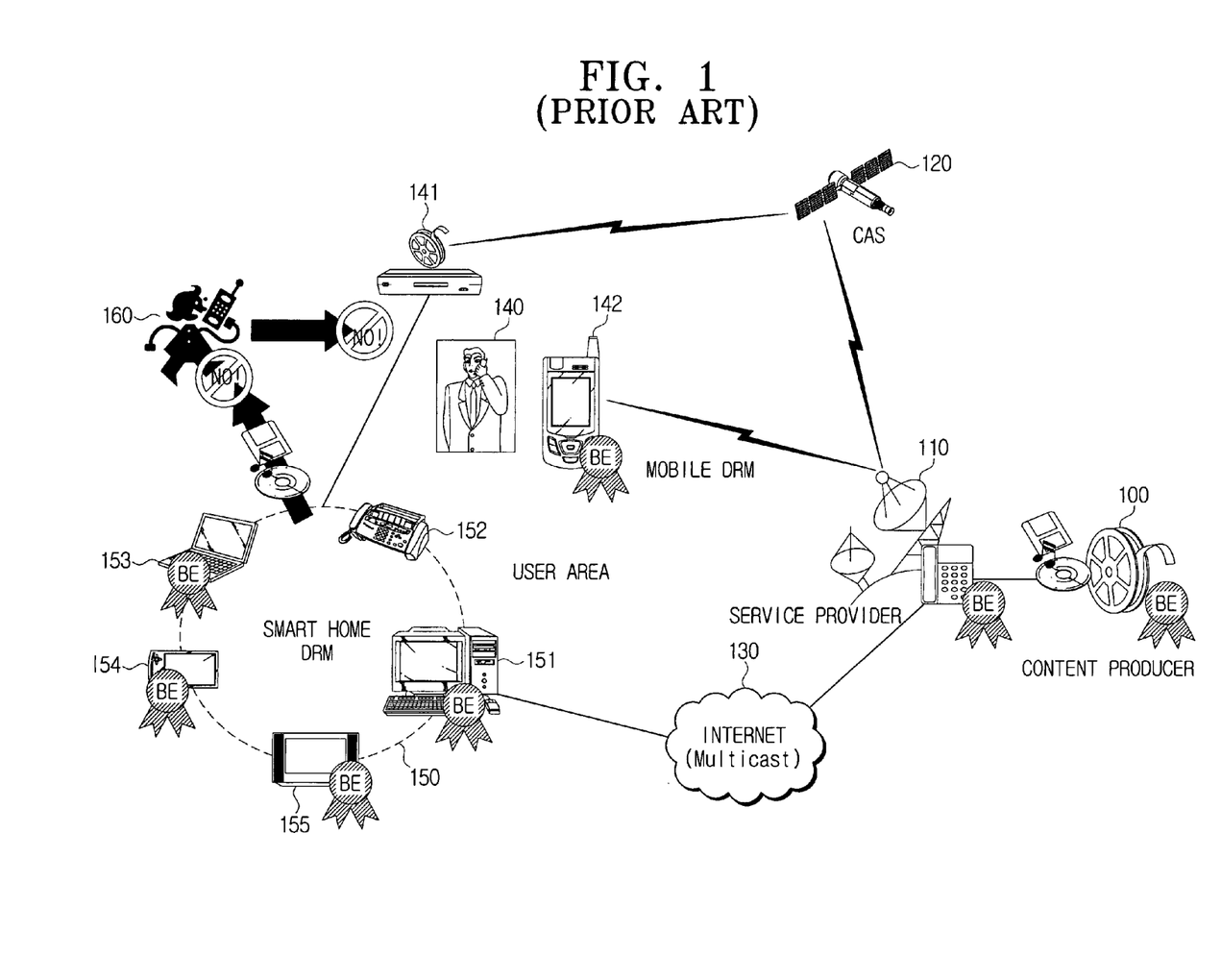
FIG. 1 illustrates a network construction of a data transmission system for a conventional broadcast encryption (BE)

FIG. 1 illustrates a network of a data transmission system according to a conventional BE. Referring to FIG. 1, a content producer 100 creates various usable data such as audio data and video data, and provides the created data to a service provider 110. The service provider 110 broadcasts the data, which is provided from the content producer 100, to authorized users, who have paid for the data, via wired and wireless communication networks such as a mobile digital right management (DRM) network 140 or a smart home DRM network 150.

Specifically, the service provider 110 can transfer data to users' devices such as set-top boxes 141 equipped with satellite receivers via a satellite 120 and transfer data to a mobile communication terminal 142 via a mobile communication network. In addition the service provider 110 can transfer data to terminals 150 through 155 in the smart home DRM network 150 over an Internet 130.

During such data transmissions, data are encrypted using the BE so as to prevent an illegal user 160 who has not paid for the data from acquiring and utilizing the data.

Security of the encryption and decryption systems depends on a system which is responsible for the encryption key management. An important concern of the encryption key management system is how to derive encryption keys. How to manage and update the derived encryption keys are also important issues.

The concept of the BE, which was initially suggested in 1991, has passed through considerable changes. The current BE presumes stateless receivers. The stateless receivers imply that secret keys of the users are not changed or updated at all as a session changes. A term 'k-resilient' is used in the security. The term 'k-resilient' denotes that k-ary revoked users cannot recover the original information even through collusion attacks. Typically, 'r' indicates the number of revoked users. Thus, 'r-resilient' implies that the information can be protected against collusion attacks by all of the revoked users.

The BE puts emphasis on a transmission overhead, a storage overhead, and a computation overhead. The transmission overhead denotes an amount of headers to be transmitted from the transmitter, the storage overhead denotes an amount of secret keys to be stored by the users, and the computation overhead denotes an amount of computations required to obtain a session key. Particularly, how to reduce the transmission overhead is an important issue.

Initially, the transmission overhead was in proportion to N which is the number of users, but now is reduced to be proportional to r which is the number of revoked users. As schemes in which the transmission overhead is proportional to r are suggested, it is desirable to determine how to reduce the transmission overhead to below r.

Various such schemes have been suggested. The Subset Difference (SD) method presented by Naor-Naor-Lotspiech shows the best results. As for n-ary users in total, the SD method requires the storage overhead $O(\log 1+en)$ and the transmission overhead $O(2r-1)$.

However, the SD method is not efficient when used by a plurality of users.

As described above, since the first paper on BE, various algorithms have been suggested. Secret sharing, a subset cover-free system model, a tree structure, and the like have been suggested.

First, the secret sharing-based model will be schematically explained. The secret sharing-based model was first suggested by S. Berkovits in 1991 and then improved in a paper entitled "Efficient Trace and Revoke Schemes" by M. Noar and B. Pinkas in 2000. In "How to Broadcast a Secret" by S. Berkovits, a polynomial interpolation method and a vector-based secret sharing method were suggested.

In the polynomial interpolation method, a center, that is, a broadcast center or a transmitter, transmits points $(x_i, y_i)$ to individual users via a secret channel. Here, $x_i$, and $(x_i, y_i)$ are secret keys of the individual users. The center selects a polynomial P having a random integer j and a degree t+j+1 to broadcast secret information S to t-ary authorized users of each session.

The polynomial P passes secret keys $(x_i, y_i)$ of the t-ary authorized users and j-ary random points (x, y) and (O, S) that are not secret keys of other users. The center transmits t+j points and other points on the polynomial P. The t-ary authorized users know about a point (their own secret keys) besides the t+j points, and thus can restore the polynomial P having the degree t+j+1 and obtain the secret information S. However, the revoked users know only about the t+j points and thus cannot restore the polynomial P.

In the polynomial interpolation method, a transmission overhead is $O(t+j+1)$, a storage overhead is $O(1)$, and a computation overhead is about $t^3$ times. Also, revocation is easy, collusion can be prevented, and traitor tracing is possible. However, the polynomial interpolation method is inefficient for a large number of users. Also, in a case where the polynomial interpolation method is repeatedly used, the polynomial interpolation method is not safe for multiple users. Thus, the polynomial interpolation method cannot be substantially used.

"Efficient Trace and Revoke Schemes" by M. Noar and B. Pinkas uses a threshold secret sharing method using a Lagrange's interpolation formula. In the method by Noar-Pinkas, an r polynomial can be restored with r+1 points on the r polynomial, but not with r points. In more detail, the center selects a random t polynomial P and offers different points on the random t polynomial P to individual users. If r-ary users are excluded, the center sums secret keys of the r-ary users and randomly selected t-r points and then broadcasts information as to t-ary points. As a result, although the excluded users sum their secret information, they know only about the t points. Non-excluded users can know about t+1 points and thus restore the polynomial P. A session key value P(0) is obtained using the polynomial P.

The Noar-Pinkas method facilitates revocation, prevents collusion, and enables traitor tracking. In particular, new users can be added, a transmission overhead is O(t), and a storage overhead is O(1). Thus, this method is considerably efficient. However, users more than t that are a first determined number cannot be excluded. In addition, a computation overhead necessary for computing a number of transmitted points or a polynomial depends on t. Thus, the Noar-Pinkas method is inefficient in many situations. Moreover, as t becomes large, computation time is increased. Thus, it is difficult to use the Noar-Pinkas method when a plurality of users are included.

In the subset cover-free system model, when a set of all users is S, a subset cover-free system is defined in a set whose members are subsets of the set S. If such a system can be found, a BE can be performed using the system. However, a storage overhead and a transmission overhead are about O(r log n). Thus, the subset cover-free system model is inefficient. Also, a method of expanding an 1-resilient model into a k-resilient model was introduced. An 1-resilient scheme can be relatively easily achieved. Thus, such an expansion appears meaningful. However, the efficiency of the 1-resilient scheme is greatly deteriorated during the expansion.

Methods using a tree structure have been recently explored. C. K. Wong, M. Gouda, and G. S. Lam suggested a Logical-tree-hierarchy (LTH) in 1998. However, in the LTH, a large number of users cannot be excluded in a one-time session. Also, as a session goes by, secret keys of users are changed. Thus, the LTH is distant from the current BE, which supposes stateless receivers. Thereafter, D. Naor, M. Naor, and J. Lotspiech suggested "Complete Subset (CS) Cover Scheme" and "Subset Difference (SD) Scheme" in 2001. On the supposition that a number of users is n and a number of excluded users is r in both methods, the center forms a binary tree having a height of log n and assigns corresponding secret keys to all nodes. Also, the center allocates users to leaf nodes one by one.

Describing the CS Cover scheme, each user receives and stores secrete keys of all nodes positioned on a path from a root node to the user's leaf node from the center. A subtree not including excluded users is called a CS. If such CSs are appropriately collected, the CSs can include only non-excluded users. At this time, if a session key is encrypted with a secret key corresponding to a root node of used CSs and then transmitted, authorized users can restore the session key. However, since excluded users are not included in any CSs, the excluded users cannot restore the session key.

Figure 2:
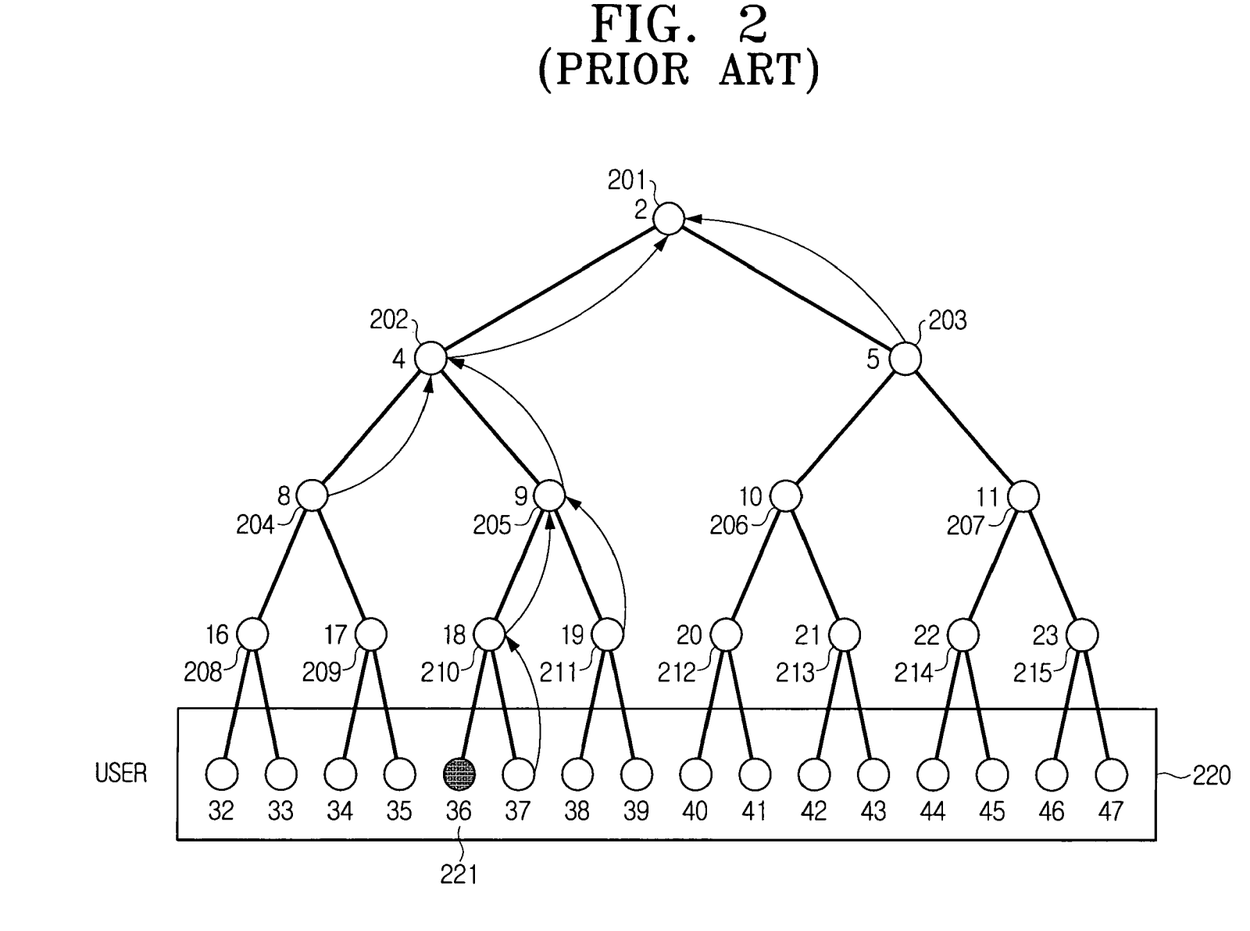
FIG. 2 illustrates a concept of the BE which assigns keys in a conventional tree structure.

FIG. 2 is a view illustrating the concept of the BE in which keys are assigned in a conventional tree structure. Referring to FIG. 2, nodes 220 receiving data through a BE scheme have their own key values 32 through 47 and key values of nodes connected to them on a tree.

For example, a node 34 has its own key value 34, a key value 209 of a node 17, a key value 204 of a node 8, a key value 202 of a node 4, and a key value 201 of a node 2. The node 34 shares the key value 209 of the node 17 with a node 35. Also, nodes 32, 33, and 35 share the key value 204 of the node 8 with the node 34.

If the nodes 32 through 47 represent all authorized users, a header of data includes the key value 201 of the node 2 so that the key value 201 of the node 2 is equally transmitted to all of the authorized users. Thus, the data may be transmitted securely.

If a user 36 is a revoked user, the key values relating to the node 36 should be updated since other users share key values of nodes related to the node 36. Specifically, key values 210, 205, 202, and 201 of the nodes 18, 9, 4, and 2 must be updated. The key values are updated from a lower node to an upper node.

Since the node 37 shares the key value 210 of the node 18, an updated key value 210 of the node 18 is encrypted as a key value of the node 37 and then transmitted to the node 37. The node 37 and the nodes 38 and 39 under the node 19 share the key value 205 of the node 9. Thus, an updated key value 205 of the node 9 is encrypted as the key value 210 of the node 18 that has been updated already and then transmitted to the node 37, and the updated key value 205 of the node 9 is encrypted as the key value 211 of the node 19 and then transmitted to the nodes 38 and 39.

The nodes 32, 33, 34, and 35 under the node 8 and the nodes 37, 38, and 39 under the node 9 share the key value 202 of the node 4. Thus, an updated key value 202 of the node 4 is encrypted as the key value 204 of the node 8 and then transmitted to the nodes 32 through 35. Also, the updated key value 202 of the node 4 is encrypted as the key value 205 of the node 9 and then transmitted to the nodes 37 through 39.

The nodes 32 through 39 under the node 4, except the node 36, and the nodes 40 through 47 under the node 5 share the key value 201 of the node 2. Thus, an updated key value 201 of the node 2 is encrypted as the key value 202 of the node 4 that has been updated and then transmitted to the users 32, 33, 34, 35, 37, 38, and 39. Also, the updated key value 201 of the node 2 is encrypted as the key value 203 of the node 5 and then transmitted to the nodes 40 through 47. Such a key updating process can block accesses of revoked users.

In the above-described method, that is, in the CS model, a transmission overhead is O(r log(n/r)) that is the number of CSs including only non-excluded users, and a storage overhead is O(log n).

An SD model is a modification of the above-described CS model, and requires a storage overhead of $O(\log^2 n)$ and a transmission overhead of O(2r−1) so as to drastically improve the transmission overhead. The SD model considers a subtree obtained by subtracting a subtree having a node w of a subtree, having a node v as a root node, as a root node from the corresponding subtree. Leaf nodes under this subtree are authorized users, and leaf nodes under the subtree having the node w as the root node are revoked users.

If revoked users are placed among an appropriate number of authorized users, the SD model may require a subset unlike the CD model requiring two or more subsets. In the SD model, hash values of keys assigned to nodes from the node v to the node w are obtained, and then values corresponding to the hash values are determined as session keys.

Each user has hash values of sibling nodes of each node on a path from the user's node to a leaf node as secret keys. Therefore, only authorized users can restore session keys due to the one-way nature of a hash function. In the SD model, a transmission overhead is O(2r−1), a storage overhead is $O(\log^2 n)$, and a computation overhead is O(log n).

An LSD model that is an improvement of the SD model was suggested in 2002. In the LSD model, a layer is used for each subtree to reduce a storage overhead to $O(\log^{3/2} n)$. However, a transmission overhead doubles that of the SD model.

The BE models do not take account of a tree structure. In other words, the BE models are effective when a single transmitter transfers data to a plurality of receivers without intermediate devices as in the satellite broadcasting. Therefore, a demand arises for a novel efficient method for use in a multihop network environment.

SUMMARY OF THE INVENTION

The present invention has been provided to address the above-mentioned and other problems and disadvantages occurring in the conventional arrangement, and an aspect of the present invention provides a key management method for a broadcast encryption in a tree topology.

According to an exemplary embodiment of the present invention, a key management method for a broadcast encryption in a tree topology network which includes a plurality of nodes is provided. The method includes forming a plurality of first node groups each of which includes a node at a second layer and nodes, which belong to the node at the second layer, at a first layer in the tree topology network; forming a plurality of second node groups each of which includes a node at a third layer, at least one node which belongs to the node at the third layer, and at least one node which belongs to the node at the third layer and which forms one of the first node groups, in the tree topology; assigning a plurality of first keys which are shared by subsets of the nodes of the first node groups at the first layer, to each of the first node groups, respectively; assigning a plurality of second keys which are shared by subsets of the nodes of the second node groups at the second layer, to each of the second node groups, respectively; and transmitting an update key which is encrypted using at least one key of either the plurality of first keys or the plurality of second keys.

The key management method may further include assigning a plurality of third keys which are different from one another and which are shared by subsets of the nodes at a third layer.

The key management method may further include transmitting an update key which is encrypted using at least one key of the plurality of first keys, the plurality of second keys, or the plurality of third keys.

The second node groups may belong to a coordinator.

The coordinator may selectively forward the encrypted update key to nodes which belong to the coordinator.

The subsets may include at least one node.

The encrypted update key may be a plurality of encrypted update keys.

The transmitted update key may be selectively forwarded by the nodes of the third layer to the nodes of the second layer, and from the nodes of the second layer to the nodes of the first layer.

The nodes may determine a direction of the forwarding based on information relating to one key of the plurality of first keys, the plurality of second keys, or the plurality of third keys, which is used to encrypt the update key.

The key management method may further include acquiring, by at least one node at the first layer, the update key by decrypting the received update key by use of one key of the plurality of first keys and the plurality of second keys which are held by the at least one node.

The first node groups may not be formed if no nodes at the first layer belong to the nodes at the second layer.

The second node groups may not be formed, if no nodes at the second layer belong to the nodes at the third layer.

The tree topology network may include more than three layers.

BRIEF DESCRIPTION OF THE DRAWING FIGURES

These and other aspects will become apparent and more readily appreciated from the following description of exemplary embodiments, taken in conjunction with the accompanying drawing figures of which.

DETAILED DESCRIPTION OF EXEMPLARY EMBODIMENTS OF THE PRESENT INVENTION

Certain exemplary embodiments of the present invention will now be described in greater detail with reference to the accompanying drawings.

In the following description, same drawing reference numerals are used for the same elements even in different drawings. The matters defined in the description, such as detailed construction and element descriptions, are provided to assist in a comprehensive understanding of the invention. Also, well-known functions or constructions are not described in detail since they would obscure the invention in unnecessary detail.

Figure 3:
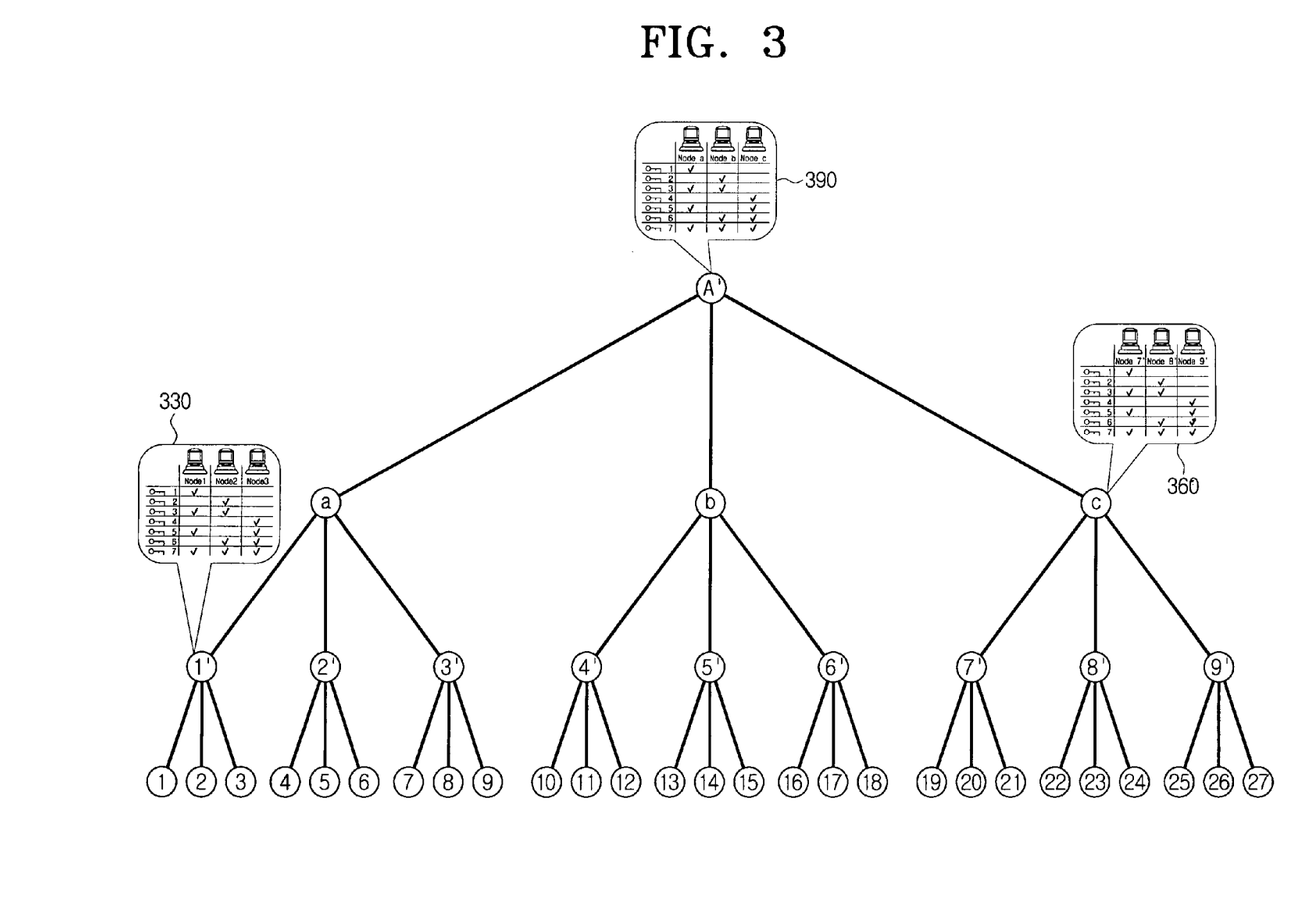
FIG. 3 illustrates a logical key hierarchy (LKH) according to an exemplary embodiment of the present invention.

FIG. 3 depicts a logical key hierarchy (LKH) according to an exemplary embodiment of the present invention.

Referring now to FIG. 3, the LKH includes forty nodes. Among the forty nodes, only nodes from a node 1 to a node 27 at a first layer are actual nodes, whereas the other nodes from a node 1' to a node 9', a node a through a node c, and a node A' are virtual nodes which include the actual nodes 1 through 27 connected to their lower branches in the tree structure. It can be said that the virtual nodes are groups of the actual nodes.

After constructing the LKH, keys are assigned to the nodes, respectively. How to assign the keys is explained based on a key table 330 of the node 1'.

The node 1' is a virtual node including the group of the node 1, the node 2, and the node 3. The key table 330 of the node 1' presupposes a key 1 through a key 7. The key 1 through the key 7 are shared by random subsets of the node 1, the node 2, and the node 3. Note that the random subsets exclude the empty set.

The key 1 is assigned only to the node 1, and the key 2 is assigned only to the node 2. The key 3 is shared by the node 1 and the node 2, and the key 4 is assigned only to the node 3. The key 5 is shared by the node 1 and the node 3, and the key 6 is shared by the node 2 and the node 3. The key 7 is shared by all of the node 1, the node 2, and the node 3.

That is, the node 1 has the key 1, the key 3, the key 5, and the key 7 in the key table 330 of the node 1'. The node 2 has the key 2, the key 3, the key 6, and the key 7 in the key table 330 of the node 1'. The node 3 has the key 4, the key 5, the key 6, and the key 7 in the key table 330 of the node 1'. In the same manner, key tables of the node 2' through the node 9' are organized respectively.

A key table 360 of the node c is now explained. A key 1 is assigned only to the node 7, and a key 2 is assigned only to the node 8. A key 3 is shared by the node 7 and the node 8, and a key 4 is assigned only to the node 9. A key 5 is shared by the node 7 and the node 9, and a key 6 is shared by the node 8 and the node 9. A key 7 is shared by all of the node 7, the node 8, and the node 9.

That is, the node 19, the node 20, and the node 21 which belong to the node 7' have all of the key 1, the key 3, the key 5, and the key 7 in the key table 360 of the node C. The node 22, the node 23, and the node 24 which belong to the node 8' have all of the key 2, the key 3, the key 6, and the key 7 in the key table 360 of the node C. The node 25, the node 26, and the node 27 which belong to the node 9' have all of the key 4, the key 5, the key 6, and the key 7 in the key table 360 of the node C. In the same manner as explained above, key tables of the node a and the node b are organized respectively.

It should be appreciated that the key 1 through the key 7 are separate keys and that the keys in the key tables are independent from each other. For example, the key 1 at the node 1' is different from the key 1 at the node c, and the keys 1 at the node 2' and the node 6' are independent from each other.

A key table 390 of the node A' is described below. A key 1 is assigned only to the node a, and a key 2 is assigned only to the node b. A key 3 is shared by the node a and the node b, and a key 4 is assigned only to the node c. A key 5 is shared by the node a and the node c, and a key 6 is shared by the node b and the node c. A key 7 is shared by all of the node a, the node b, and the node c.

That is, the node 19 and the node 1 through the node 9 which belong to the node a have all of the key 1, the key 3, the key 5, and the key 7 in the key table 390 of the node A'. The node 10 through the node 18 which belong to the node b have all of the key 2, the key 3, the key 6, and the key 7 in the key table 390 of the node A'. The node 19 through the node 27 which belong to the node c have all of the key 4, the key 5, the key 6, and the key 7 in the key table 390 of the node A'.

Among the nodes in FIG. 3, the actual nodes 1 through 27 can be respective users in relation with a service provider. The service provider encrypts contents to be provided to the users, using the above keys and transfers the encrypted contents to the users. Basically, a subscribed user holds the key that is used to encrypt the contents by the service provider. Such a key is assigned from the service provider according to a service subscription and a service extension application.

Accordingly, the subscribed user decrypts the contents, which is encrypted and transmitted by the service provider, using its key.

However, if a certain user cancels his/her service subscription or does not pay for the service, that is, a certain user is revoked, the service provider needs to prevent the certain user from further utilizing the service.

To this end, the service provider has to encrypt next contents using a new key and transmit the new key which is used to encrypt the next contents, to the rest of the users excluding the certain user. That is, a key update is required.

In case that all users under the node c, that is, the users corresponding to the node 19 through the node 27 are revoked, the service provider encrypts and transmits the new key using the key 3 in the key table 390 of the node A'.

In case that a user corresponding to the node 2 is revoked, the service provider encrypts the new key using the key 6 in the key table 390 of the node A'. Also, the service provider encrypts the new key using the key 6 in a key table (not shown) of the node a, which is shared by the nodes under the node 2' and the node 3', and encrypts the new key using the key 5 in the key table 330 of the node 1'. Next, the service provider transmits the three encrypted data all together in sequence.

Figure 4:
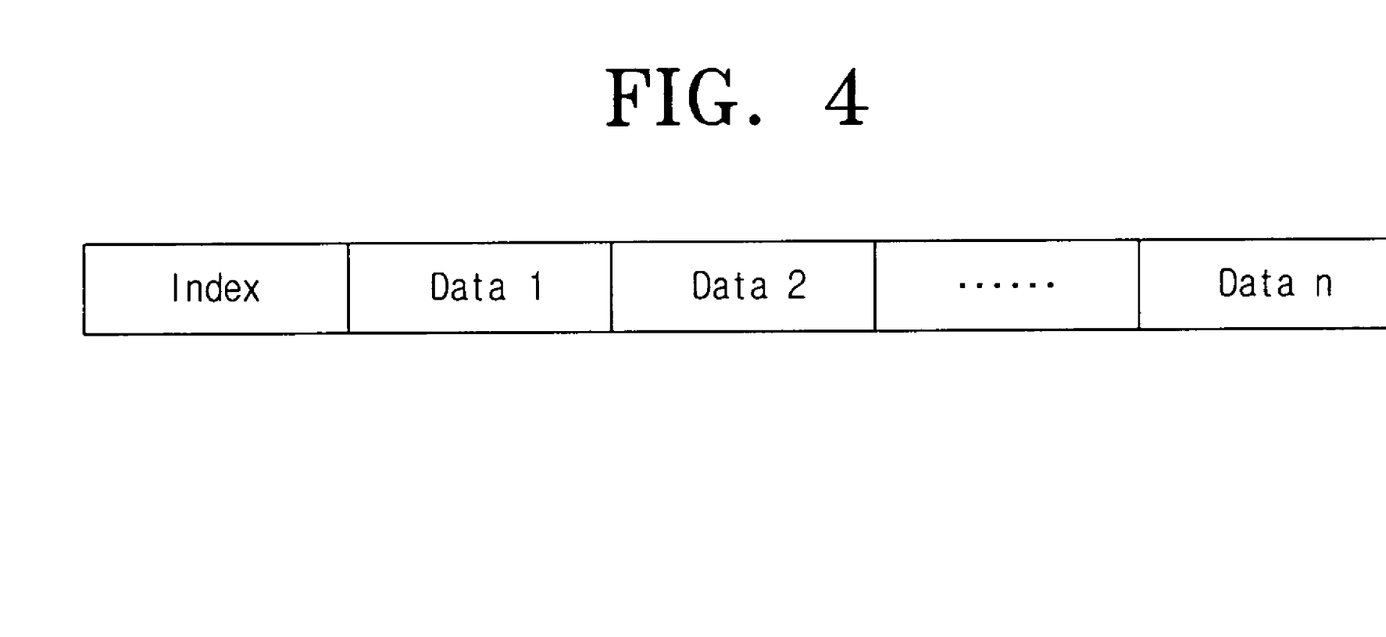
FIG. 4 illustrates a format of a data packet which is encrypted and transferred by a service provider.

FIG. 4 depicts a format of the data encrypted and transmitted by the service provider.

Indices indicate information relating to respective data contained in a first data area through a n-th data area. Nodes, upon receiving the data packet as shown in FIG. 4, recognize the data area containing the new key which is encrypted using its holding key, based on the index, and decrypts the new key in the data area using its holding key.

As a result, the users corresponding to the node 10 through the node 27 can decrypt the received data using their holding key 6 in the key table 390 of the node A' and thus obtain the new key.

The users corresponding to the node 4 through the node 9 decrypt the received data using their holding key 6 in the key table (not shown) of the node a and thus acquire the new key.

Likewise, the users corresponding to the node 1 and the node 3 decrypt the received data using their holding key 5 in the key table 330 of the node 1' and thus acquire the new key.

Afterwards, when the service provider encrypts contents using the new key and transmits the encrypted contents, all the users, excluding the user corresponding to the node 2, decrypt the received contents using the acquired new key.

The key update method as illustrated in FIG. 3 may be suitable for a network environment which presumes a service provider and a plurality of users, but not suitable for a tree topology network environment.

Figure 5A:
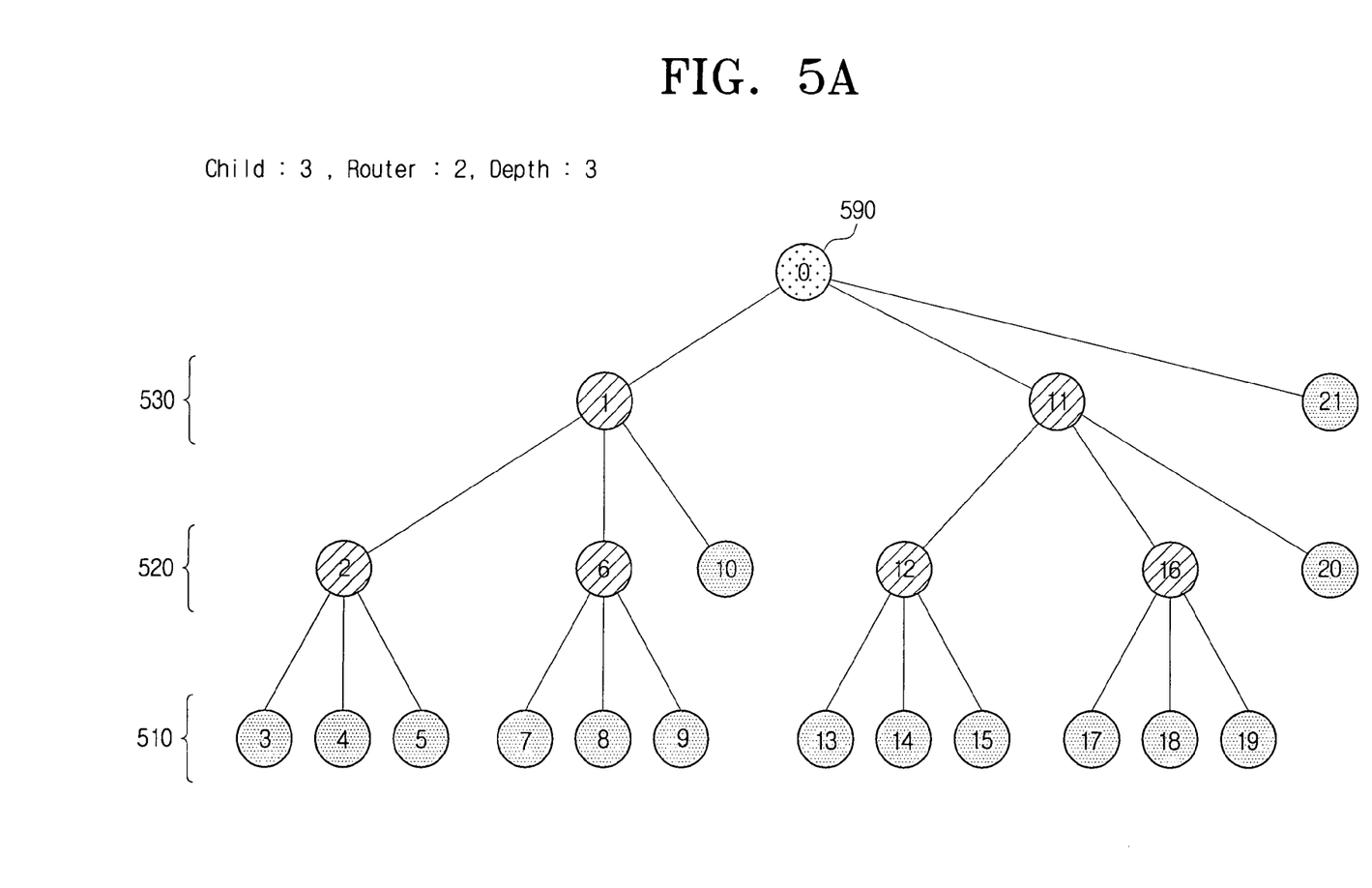
FIG. 5A illustrates a tree topology network to which an exemplary embodiment of the present invention is applied.

FIG. 5A depicts a tree topology network to which an exemplary embodiment of the present invention is applied. The tree topology network includes a first layer 510, a second layer 520, a third layer 530, and a coordinator 590.

Upper layers above the third layer 530 may include a fourth layer, a fifth layer, and so on.

The first layer 510 includes end nodes 3 through 19. The second layer 520 includes router nodes 2, 6, 12, and 16, and end nodes 10 and 20. The third layer 530 includes router nodes 1 and 11, and an end node 21. The tree topology network may include a fourth layer, a fifth layer, and so on.

In FIG. 5A, each router node has three child nodes. Among the three child nodes, two child nodes are router nodes, and the other node is an end node. Note that the router nodes at the second layer 520 have their child nodes as end nodes. Each router node can have an arbitrary number of child nodes, and the numbers of router nodes and end nodes in the child nodes are arbitrary.

When the key update method is implemented in the tree topology network as shown in FIG. 5A, unnecessary data transmissions increase. In further detail, the router nodes forward data in the tree topology. It is undesirable in view of the efficiency of the wireless network to constantly forward the data packet, as shown in FIG. 4, along the branches in the tree topology.

In short, the key update method as illustrated in FIG. 3 is inefficient to apply to the wireless network which requires routing, such as that shown in FIG. 5A.

Such disadvantages can be resolved by implementing the LKH in FIG. 3 into the tree topology network.

Figure 5B:
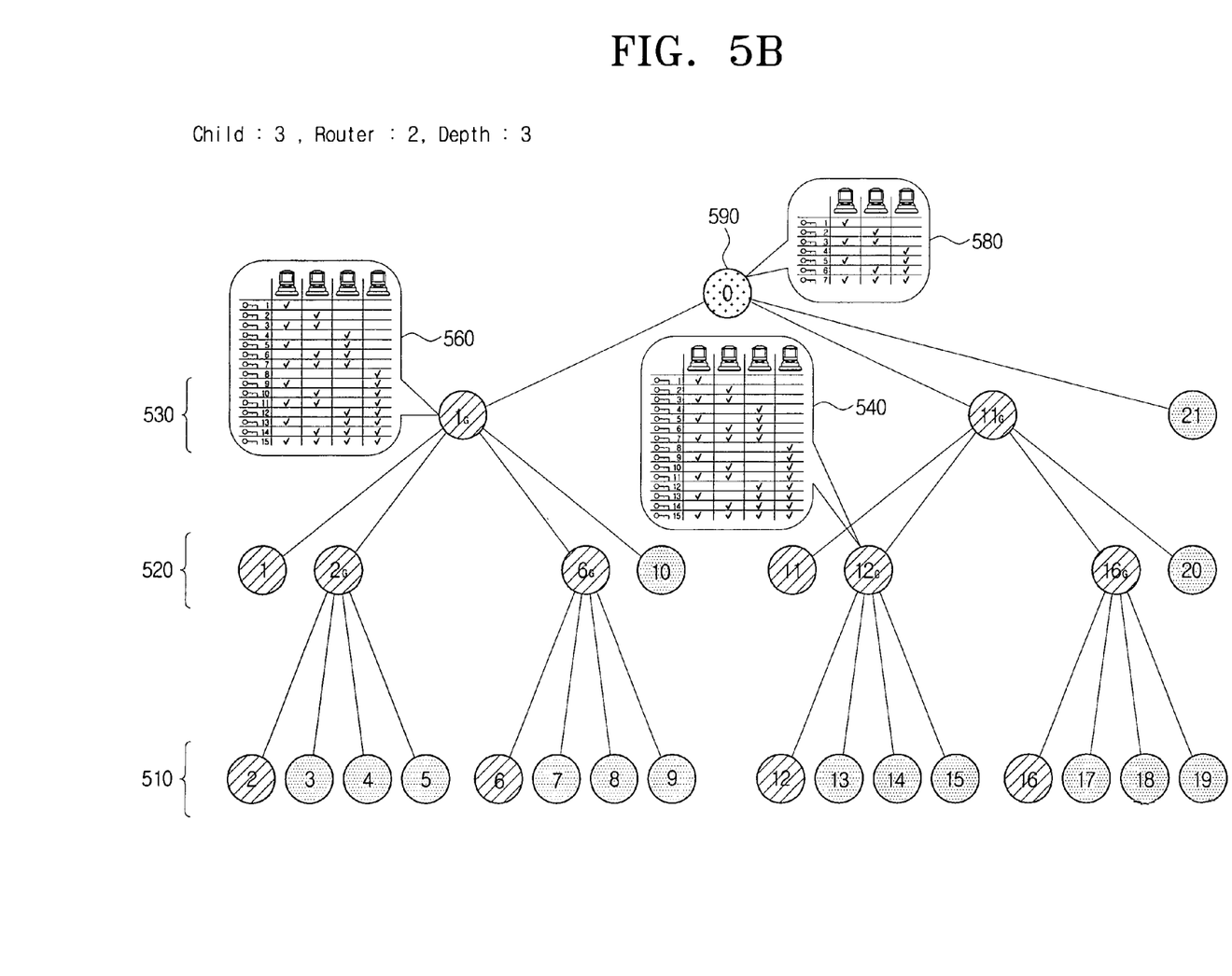
FIG. 5B illustrates how to implement the LKH in the tree topology network.

FIG. 5B depicts implementation of the LKH in the tree topology network.

Referring to FIGS. 5A and 5B, how to implement the LKH in the tree topology network is now described. Nodes 3, 4 and 5 are child nodes of a node 2. The node 2 together with the nodes 3, 4, and 5 form a node group $2_G$. In other words, the node group $2_G$ consists of the nodes 2, 3, 4, and 5. Herein, the node group is not an actual node, but a virtual node.

Nodes 7, 8 and 9 are child nodes of a node 6. The node 6 together with the nodes 7, 8 and 9 form a node group $6_G$. In other words, the node group $6_G$ consists of the nodes 6, 7, 8, and 9.

Nodes 13, 14 and 15 are child nodes of a node 12. The node 12 together with the nodes 13, 14 and 15 form a node group $12_G$. In other words, the node group $12_G$ consists of the nodes 12, 13, 14, and 15.

Nodes 17, 18 and 19 are child nodes of a node 16. The node 16 together with the nodes 17, 18 and 19 form a node group $16_G$. In other words, the node group $16_G$ consists of the nodes 16, 17, 18, and 19.

As such, the formation of the node groups at the first layer 510 and the second layer 520 is completed. Hereafter, how to form node groups at the second layer 520 and the third layer 530 is explained in detail.

The node group $2_G$, the node group $6_G$, and a node 10 belong to a node 1. The node 1 together with the node group $2_G$, the node group $6_G$, and the node 10 form a node group $1_G$. That is, the node group $1_G$ consists of the node 1, the node group $2_G$, the node group $6_G$, and the node 10.

The node group $12_G$, the node group $16_G$, and a node 20 belong to a node 11. The node 11 together with the node group $12_G$, the node group $16_G$, and the node 20 form a node group $11_G$. That is, the node group $11_G$ consists of the node 11, the node group $12_G$, the node group $16_G$, and the node 20.

With the node groups constructed as above, it can be seen that the tree topology network in FIG. 5A is transformed to the LKH as shown in FIG. 5B.

Figure 5C:
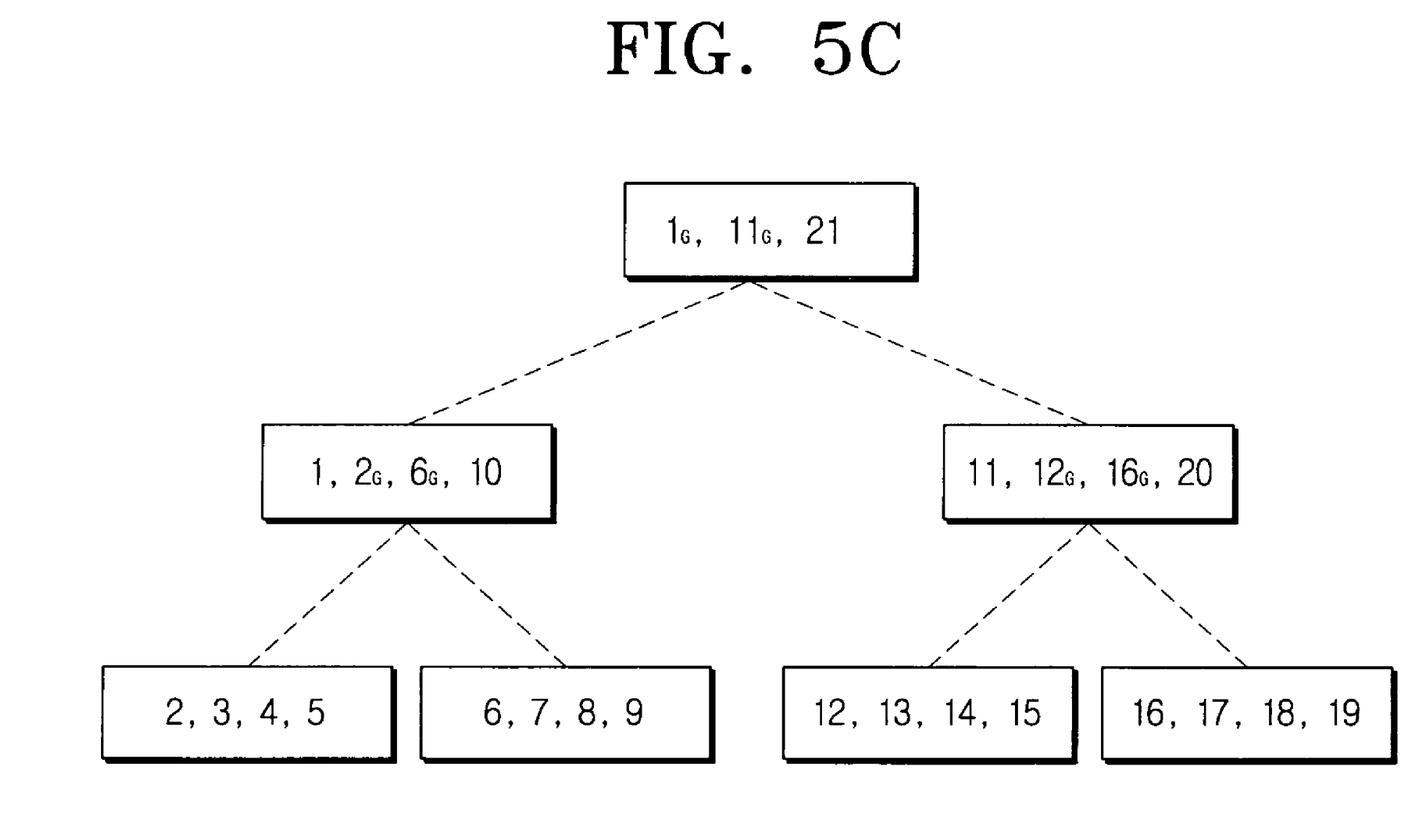
FIG. 5C illustrates the tree topology network which is transformed to the LKH.

FIG. 5C depicts the LKH which is transformed from the tree topology.

Referring to FIG. 5C, nodes 2, 3, 4, and 5 form a node group $2_G$. Nodes 6, 7, 8, and 9 form a node group $6_G$. Nodes 12, 13, 14, and 15 form a node group $12_G$. Nodes 16, 17, 18, and 19 form a node group $16_G$.

A node 1, the node group $2_G$, the node group $6_G$, and a node 10 form a node group $1_G$. A node 11, the node group $12_G$, the node group $16_G$, and a node 20 form a node group $11_G$. Accordingly, the node group $1_G$, the node group $11_G$, and the node 21 belong to the coordinator 590.

Referring back to FIG. 5B, an operation in the tree topology network is now set forth. After constructing the LKH as shown in FIG. 5B, keys are assigned to the nodes respectively. The key assignment scheme is explained in relation with the key table 540 at the node group $12_G$.

The node group $12_G$ is a virtual node which consists of the nodes 12 through 15. The key table 540 of the node group $12_G$ presupposes keys 1 through 15. The keys 1 through 15 are shared by arbitrary subsets which consist of the node 12 through 15. Note that an empty set is excluded from the arbitrary subsets.

Specifically, the node 12 has the keys 1, 3, 5, 7, 9, 11, 13, and 15 (i.e. first column) in the key table 540 of the node group $12_G$. The node 13 has the keys 2, 3, 6, 7, 10, 11, 14, and 15 in the key table 540 (i.e. second column). The node 14 has the keys 4, 5, 6, 7, 12, 13, 14, and 15 in the key table 540 (i.e. third column). The node 15 has the keys 8, 9, 10, 11, 12, 13, 14, and 15 in the key table 540 (i.e. fourth column).

In the same manner, key tables of the node groups $2_G$, $6_G$, and $16_G$ are organized.

In the key table 560 of the node group $1_G$, the node 1 has the keys 1, 3, 5, 7, 8, 11, 13, and 15. The nodes 2 through 5, which belong the node group $2_G$, have the keys 2, 3, 6, 7, 10, 11, 14, and 15. The nodes 6 through 9, which belong the node group $6_G$, have the keys 4, 5, 6, 7, 12, 13, 14, and 15. The node 10 has the keys 8, 9, 10, 11, 12, 13, 14, and 15.

In the same manner, a key table of the node group $11_G$ is organized. It should be appreciated that the keys 1 through 15 are separate keys and that the keys in the key tables are independent from each other. For example, the key 1 in the node group $12_G$ is different from the key 1 in the node group $1_G$, and the key 1 in the node group $2_G$ is independent from the key 1 in the node group $6_G$.

The key table 580 of the coordinator 590 is now described. The nodes 1 through 10, which belong to the node group $1_G$, have the keys 1, 3, 5, and 7 in the key table 580 of the coordinator 590. The nodes 11 through 20, which belong to the node group 11, have the keys 2, 3, 6, and 7. The node 21 has the keys 4, 5, 6, and 7.

Figure 6A:
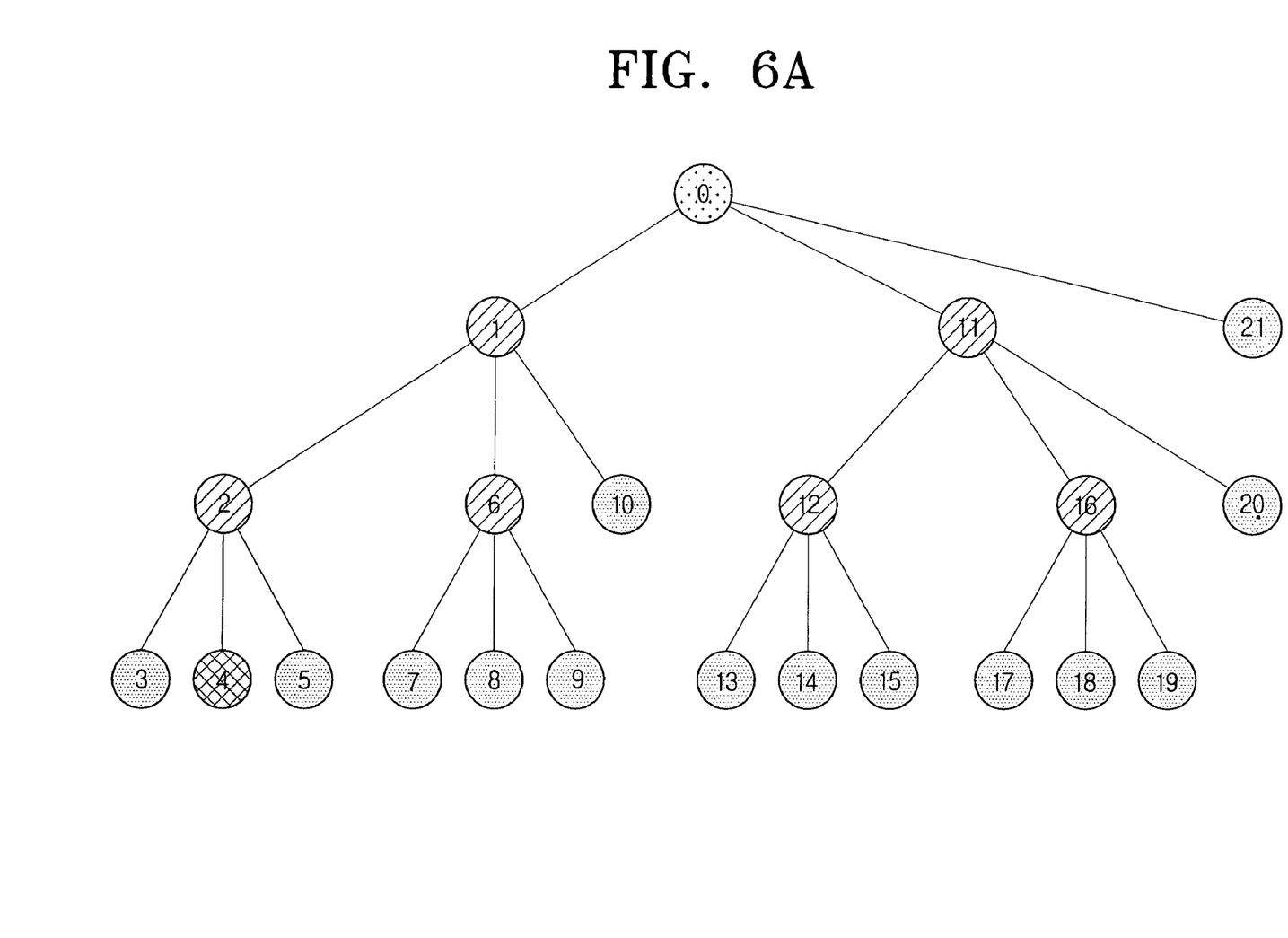
FIG. 6A illustrates the tree topology network according to an exemplary embodiment of the present invention.
Figure 6B:
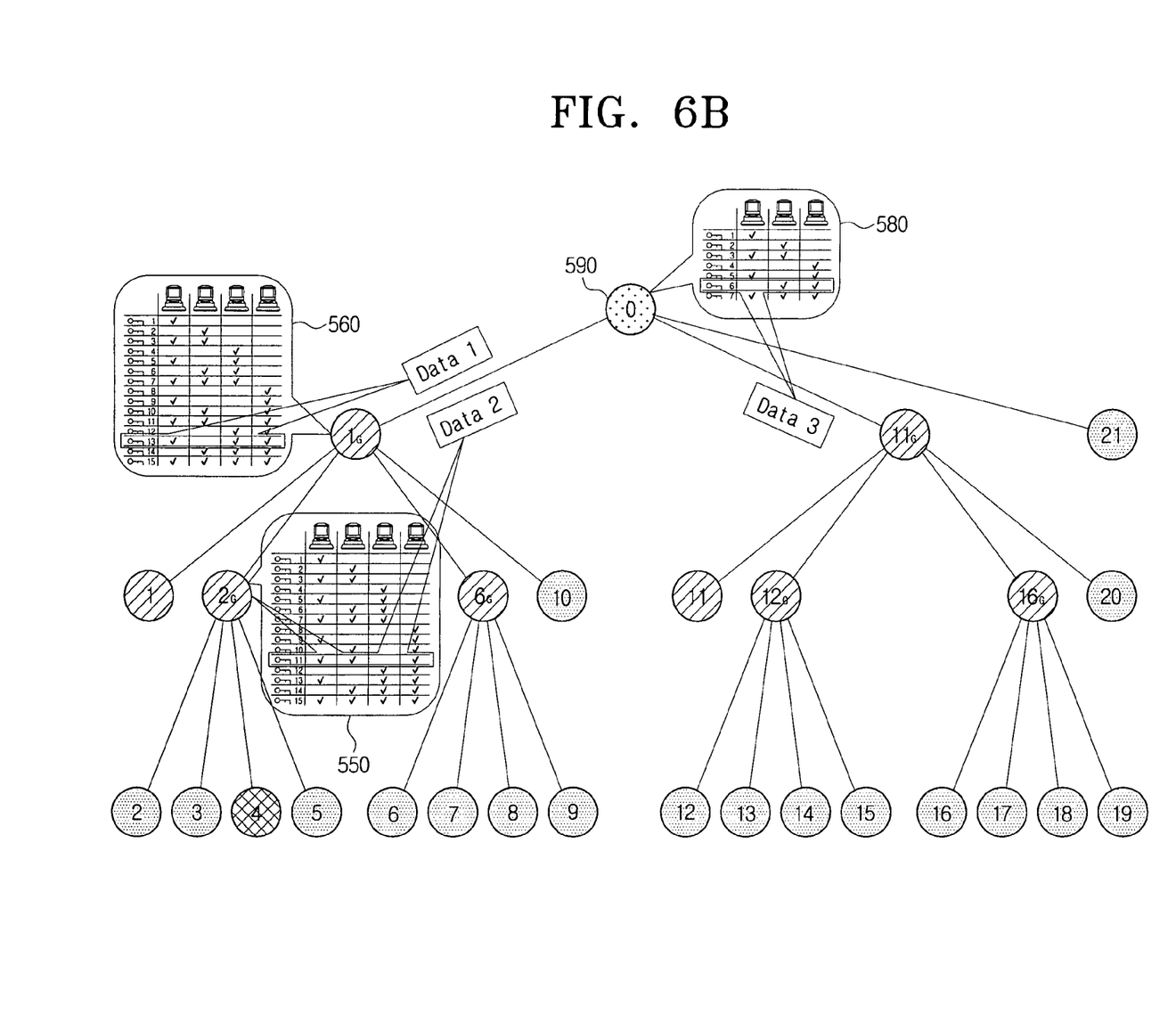
FIG. 6B illustrates the LKH according to an exemplary embodiment of the present invention.

FIG. 6A depicts the tree topology network according to an exemplary embodiment of the present invention, and FIG. 6B depicts the LKH according to an exemplary embodiment of the present invention.

In the following, descriptions are made of a key management method for a broadcast encryption according to an exemplary embodiment of the present invention in reference to FIGS. 6A and 6B. In FIG. 6A, when a user corresponding to the node 4 is revoked, the service provider generates first data, second data, and third data. The first data is generated by encrypting a new key using the key 13, which is held only by the node 1, the nodes 6 through 9 under the node group 6, and the node 10, in the key table 560 of the node group $1_G$. The second data is generated by encrypting the new key using the key 11, which is held only by the node 2, the node 3, the node 5, in the key table 550 of the node group $2_G$. The third data is generated by encrypting the new key using the key 6 in the key table 580 of the coordinator 590.

Figure 6C:
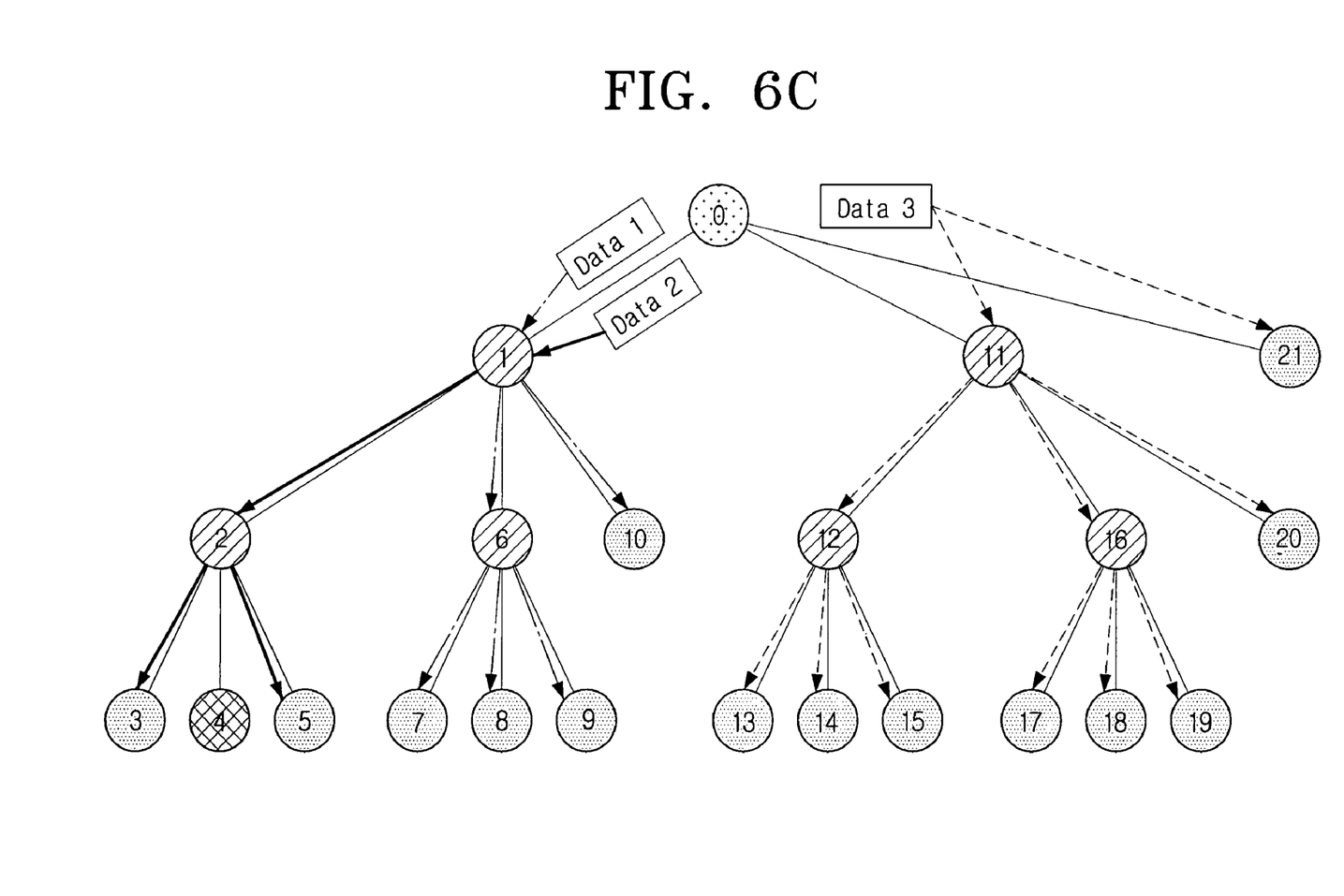
FIG. 6C illustrates how to forward the encrypted data according to an exemplary embodiment of the present invention.

FIG. 6C depicts how to forward the encrypted data according to an exemplary embodiment of the present invention.

Referring to FIGS. 6B and 6C, the coordinator 590 recognizes from the first data that the new key is encrypted using the key 13, which is held by the nodes 1, 6, 7, 8, 9, and 10, in the key table 560 of the node group $1_G$, and forwards the first data toward the node 1.

The node 1 recognizes from the first data received from the coordinator 590 that the new key is encrypted using the key 13, which is held by the nodes 1, 6, 7, 8, 9, and 10, in the key table 560 of the node group $1_G$, and forwards the first data toward the node 6 and the node 10.

Likewise, the node 6 recognizes from the first data that the new key is encrypted using the key 13, which is held by the nodes 1, 6, 7, 8, 9, and 10, in the key table 560 of the node group $1_G$, and forwards the first data to the nodes 7, 8, and 9.

The coordinator 590 recognizes from the second data that the new key is encrypted using the key 11, which is held by the nodes 2, 3, and 5, in the key table 550 of the node group $2_G$, and forwards the second data toward the node 1.

The node 1 recognizes from the second data that the new key is encrypted using the key 11, which is held by the nodes 2, 3, and 5, in the key table 550 of the node group $2_G$, and forwards the second data toward the node 2.

The node 2 recognizes from the second data that the new key is encrypted using the key 11, which is held by the nodes 2, 3, and 5, in the key table 550 of the node group $2_G$, and forwards the second data to the node 3 and the node 5.

Hence, the node 3 and the node 5 decrypt the second data using their key 11 which is in the key table 550 of the node group $2_G$ and thus acquire the new key.

The coordinator 590 recognizes from the third data that the new key is encrypted using the key 6, which is held by the nodes 11 through 21, in the key table 580 of the coordinator 590, and forwards the third data to the node 11 and the node 21.

The node 11 recognizes from the third data that the new key is encrypted using the key 6, which is held by the nodes 11 through 21, in the key table 580 of the coordinator 590, and forwards the third data to the nodes 12, 16, and 20.

The node 12 recognizes from the third data that the new key is encrypted using the key 6, which is held by the nodes 11 through 21, in the key table 580 of the coordinator 590, and forwards the third data to the nodes 13, 14, and 15.

The node 16 recognizes from the third data that the new key is encrypted using the key 6, which is held by the nodes 11 through 21, in the key table 580 of the coordinator 590, and forwards the third data to the nodes 17, 18, and 19.

Therefore, every node, excluding the node 4, can acquire the new key by decrypting the received data using its key.

Afterwards, when transmitting contents, the user encrypts the contents using the new key. Every user, excluding the user corresponding to the node 4, decrypts the received contents using the new key and utilizes the acquired contents.

The coordinator 590 and the router nodes 1, 2, 6, 11, 12, an 16 can selectively forward the first data, the second data, and the third data which have small data size, rather than the data packet which is the combination of the first data, the second data, and the third data.

The key management method for the broadcast encryption according to an exemplary embodiment of the present invention, as discussed above, can be applied to an efficient key management in a network that requires a multihop routing in communications between an access point or a key management system (KMS) and a node.

Furthermore, in a case where a specific node is revoked in the home network, the key management method for the broadcast encryption according to an exemplary embodiment of the present invention can be employed for the key update and transmission over the network.

As set forth above, exemplary embodiments of the present invention can implement efficient broadcast encryption in the tree topology network. In addition, the efficient key update and management is feasible in the wireless network where routing is required.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A key management method for broadcast encryption in a tree topology network, which includes a plurality of nodes, the plurality of nodes comprising actual nodes and virtual nodes:
   constructing, by a processor, a logical key hierarchy with includes multiple layers in the tree topology network;
   the bottom layer consists of actual nodes;
   forming a first virtual node layer above the actual nodes, the first virtual node layer comprising a plurality of virtual node groups, each virtual node group consists of a group of at least one actual node;
   forming, a second virtual node layer above the first layer of virtual nodes which includes a group of at least one virtual node groups;
   forming, a third virtual node layer above the second virtual node layer that consist of at least one virtual node groups;
   after constructing the logical key hierarchy assigning keys to the nodes using key tables that assigns keys respectively to virtual and actual nodes using subsets that have the ability to exclude logical or actual nodes from receiving a key;
   the keys in the key tables are independent of each other.

2. The key management method of claim 1, further comprising:
   assigning a plurality of third keys which are different from one another and which are shared by subsets of the nodes at the third layer of the tree topology network.

3. The key management method of claim 2, further comprising:
   transmitting the update key which is encrypted using the assigned plurality of third keys to nodes at the third layer of the tree topology network.

4. The key management method of claim 1, wherein the plurality of second virtual node groups belong to a coordinator node of the tree topology network.

5. The key management method of claim 4, further comprising:
   revoking an end node of the tree topology network,
   wherein the coordinator selectively forwards the encrypted update key to end nodes other than the revoked end node.

6. The key management method of claim 1, wherein the subsets include at least one node.

7. The key management method of claim 1, wherein the encrypted update key is a plurality of encrypted update keys.

8. The key management method of claim 1, wherein only one of the transmitted update key which is encrypted using one of the plurality of first keys and the transmitted update key which is encrypted using one of the plurality of second keys is selectively forwarded by nodes of first layer of the tree topology network to nodes of the second layer of the tree topology network.

9. The key management method of claim 8, wherein router nodes determine a direction of the forwarding based on information relating to one key of the plurality of first keys and the plurality of second keys, which is used to encrypt the update key.

10. The key management method of claim 1, further comprising:
    acquiring, by at least one node at the first layer, the update key by decrypting the received update key by use of one key of the plurality of first keys and the plurality of second keys which are held by the at least one node.

11. The key management method of claim 1, wherein the plurality of first virtual node groups are not formed if no nodes at the first layer of the tree topology network belong to the nodes at the second layer of the tree topology network.

12. The key management method of claim 1, wherein the plurality of second virtual node groups are not formed if no nodes at the second layer of the tree topology network belong to the nodes at the third layer of the tree topology network.

13. The key management method of claim 1, wherein the tree topology network includes more than three layers.

14. The key management method of claim 1, wherein the first plurality of keys comprises $2^n-1$ keys that are respectively shared by $2^n-1$ unique subsets of the nodes of the first node groups, and
    wherein the second plurality of keys comprises $2^n-1$ keys that are respectively shared by $2^n-1$ unique subsets of the nodes of the second node groups, and
    wherein n is a positive integer.

15. The key management method of claim 1, further comprising:

assigning a plurality of third keys which are shared by subsets of nodes at the third layer of the tree topology network, and wherein the transmitting comprises:
encrypting the update key as first data using one key of the plurality of first keys;
encrypting the update key as second data using one key of the plurality of second keys;
encrypting the update key as third data using one key of the plurality of third keys; and
selectively transmitting, to each of the end nodes in the tree topology network, only one of the first data, the second data, and the third data.

* * * * *